(12) United States Patent
Sauerwein et al.

(10) Patent No.: US 11,261,645 B2
(45) Date of Patent: Mar. 1, 2022

(54) HINGE-BASED DOOR CONTROL SYSTEM

(71) Applicant: Warren Industries Ltd., Concord (CA)

(72) Inventors: Sven Sauerwein, Newmarket (CA); Pasit Banjongpanith, Stouffville (CA)

( * ) Notice: Subject to any disclaimer, the term of this patent is extended or adjusted under 35 U.S.C. 154(b) by 55 days.

(21) Appl. No.: 16/649,466

(22) PCT Filed: Sep. 21, 2018

(86) PCT No.: PCT/CA2018/051196
§ 371 (c)(1),
(2) Date: Mar. 20, 2020

(87) PCT Pub. No.: WO2019/056125
PCT Pub. Date: Mar. 28, 2019

(65) Prior Publication Data
US 2020/0300023 A1  Sep. 24, 2020

Related U.S. Application Data (60) Provisional application No. 62/561,209, filed on Sep. 21, 2017.

(51) Int. Cl.
*E05F 15/624* (2015.01)
*E05F 15/622* (2015.01)
(Continued)

(52) U.S. Cl.
CPC .......... *E05F 15/624* (2015.01); *E05C 17/003* (2013.01); *E05D 11/087* (2013.01);
(Continued)

(58) Field of Classification Search
CPC ....... E05F 15/624; E05F 15/622; E05F 15/70; E05F 15/75; E05F 5/025; E05D 11/087;
(Continued)

(56) References Cited

U.S. PATENT DOCUMENTS 6,282,752 B1 * 9/2001 Kluting ............... E05D 11/1057
16/322
6,742,388 B1 * 6/2004 Osentoski ............... B60J 5/047
73/488

(Continued)

FOREIGN PATENT DOCUMENTS

| WO | WO2015048876 A1 | 4/2015 |
| WO | WO2016164024 A1 | 10/2016 |
| WO | WO2018098594 A1 | 6/2018 |

OTHER PUBLICATIONS

International Search Report and Written Opinion issued in connection with International Application No. PCT/CA2018/051196.

*Primary Examiner* — Justin B Rephann
(74) *Attorney, Agent, or Firm* — Millman IP Inc.

(57) ABSTRACT

A vehicle door control system is provided, and includes a body hinge member connected to the vehicle body, a door hinge member connected to the door, a brake and a control system. The brake includes a plate pack that includes a plurality of body brake plates connected to the body hinge member, and interleaved with a plurality of door brake plates connected to the door hinge member. The plate pack is positionable in a braking state in which the body brake plates and the door brake plates are frictionally engaged with one another to provide a first resistance to relative rotation therebetween so as to hold the vehicle door in a selected position, and a release state in which the body brake plates and the door brake plates provide a second resistance to relative rotation therebetween that is less than the first resistance.

16 Claims, 11 Drawing Sheets

(51) Int. Cl.
| | |
|---|---|
| *E05F 15/70* | (2015.01) |
| *E05F 15/75* | (2015.01) |
| *E05D 11/08* | (2006.01) |
| *E05F 5/02* | (2006.01) |
| *E05C 17/00* | (2006.01) |
| *F16D 55/36* | (2006.01) |
| *F16D 65/18* | (2006.01) |
| *F16H 1/46* | (2006.01) |
| *F16D 121/24* | (2012.01) |
| *F16D 125/40* | (2012.01) |
| *F16H 25/20* | (2006.01) |

(52) U.S. Cl.
CPC ............ *E05F 5/025* (2013.01); *E05F 15/622* (2015.01); *E05F 15/70* (2015.01); *E05F 15/75* (2015.01); *F16D 55/36* (2013.01); *F16D 65/186* (2013.01); *F16H 1/46* (2013.01); *E05D 2011/088* (2013.01); *E05Y 2201/21* (2013.01); *E05Y 2201/246* (2013.01); *E05Y 2201/434* (2013.01); *E05Y 2400/32* (2013.01); *E05Y 2400/36* (2013.01); *E05Y 2800/114* (2013.01); *E05Y 2900/531* (2013.01); *F16D 2121/24* (2013.01); *F16D 2125/40* (2013.01); *F16H 25/20* (2013.01)

(58) Field of Classification Search
CPC . E05D 2011/088; F16D 55/36; F16D 65/186; F16D 2125/40; F16H 1/46; F16H 25/20; E05Y 2201/21; E05Y 2201/246; E05Y 2201/434; E05Y 2400/32; E05Y 2400/36; E05Y 2800/114; E05Y 2900/531
See application file for complete search history.

(56) References Cited

U.S. PATENT DOCUMENTS

| | | | |
|---|---|---|---|
| 2003/0102692 A1* | 6/2003 | Mooy | E05D 5/062 |
| | | | 296/146.11 |
| 2008/0309118 A1* | 12/2008 | Kohlstrand | E05F 5/00 |
| | | | 296/146.1 |
| 2009/0217596 A1* | 9/2009 | Neundorf | E05B 81/20 |
| | | | 49/506 |
| 2010/0156139 A1* | 6/2010 | Herrmann | E05F 15/611 |
| | | | 296/146.4 |
| 2014/0150581 A1* | 6/2014 | Scheuring | E05F 15/622 |
| | | | 74/89.38 |
| 2015/0330134 A1* | 11/2015 | Bendel | E05F 15/611 |
| | | | 701/49 |
| 2017/0030131 A1 | 2/2017 | Elie et al. | |
| 2017/0260790 A1* | 9/2017 | Sauerwein | E05F 15/53 |
| 2017/0260792 A1 | 9/2017 | Torres Fernandez et al. | |
| 2017/0292310 A1* | 10/2017 | Podkopayev | E05F 15/622 |
| 2017/0292311 A1 | 10/2017 | Podkopayev | |
| 2018/0155968 A1* | 6/2018 | Miu | E05C 17/006 |
| 2018/0202212 A1* | 7/2018 | Xiao | E05F 3/00 |

* cited by examiner

HINGE-BASED DOOR CONTROL SYSTEM

CROSS-REFERENCE TO RELATED APPLICATIONS

This application claims the benefit of U.S. Provisional Patent application 62/561,209 filed Sep. 21, 2017, the contents of which are incorporated herein in their entirety.

FIELD

This disclosure relates generally to vehicle door check systems and more particularly to door check systems that permit a user to select a position at which a door is to be checked.

BACKGROUND

Vehicle doors are typically swung between fully closed and fully opened positions to permit ingress and egress of passengers to and from a vehicle. A door check system is typically employed to provide one or more intermediate holding positions for the door for convenience. Traditional door check systems suffer from a number of deficiencies, however. For example, the intermediate positions provided by the door check system can sometimes be inconvenient in the sense that they either don't give a vehicle user sufficient room to enter or leave the vehicle, or they are positioned so far outward that the door is at risk of hitting a door from an adjacent parked vehicle (e.g. in a mall parking lot).

The patent literature contains some proposed door check systems that permit infinite adjustability in terms of selecting an intermediate position at which to hold the door between the fully open and fully closed position. Such systems are, in some instances, complex, prone to failure due to contamination with debris, and can be large, intruding significantly on the already restricted amount of space available inside a vehicle door. It would be beneficial to provide a door check system that at least partially addresses one or more of the problems described above or other problems associated with door check systems of the prior art.

SUMMARY OF THE DISCLOSURE

In one aspect, there is provided a vehicle door control system for a vehicle having a vehicle body and a vehicle door. The vehicle door control system includes a body hinge member connected to the vehicle body, a door hinge member connected to the vehicle door, a brake and a control system. The door hinge member is pivotally connected to the body hinge member for pivotal motion about a door pivot axis. The brake includes a plate pack that includes a plurality of body brake plates connected to the body hinge member, and interleaved with a plurality of door brake plates connected to the door hinge member, wherein the plate pack is positionable in a braking state in which the body brake plates and the door brake plates are frictionally engaged with one another to provide a first resistance to relative rotation therebetween so as to hold the vehicle door in a selected position, and a release state in which the body brake plates and the door brake plates provide a second resistance to relative rotation therebetween that is less than the first resistance. The brake further includes a plate pack driver that is movable between a braking position in which the plate pack driver compresses the plate pack to bring the plate pack to the braking state and a release position in which the plate pack driver decompresses the plate pack to bring the plate pack to the release state, and a motor that is operatively connected to the plate pack driver to drive the plate pack driver to the braking and release position. The control system is configured to selectably drive the motor to bring the plate pack driver to the braking and release positions.

BRIEF DESCRIPTIONS OF THE DRAWINGS

For a better understanding of the embodiment described herein and to show more clearly how they may be carried into effect, reference will now be made, by way of example only, to the accompanying drawings in which.

DETAILED DESCRIPTION

Figure 1:
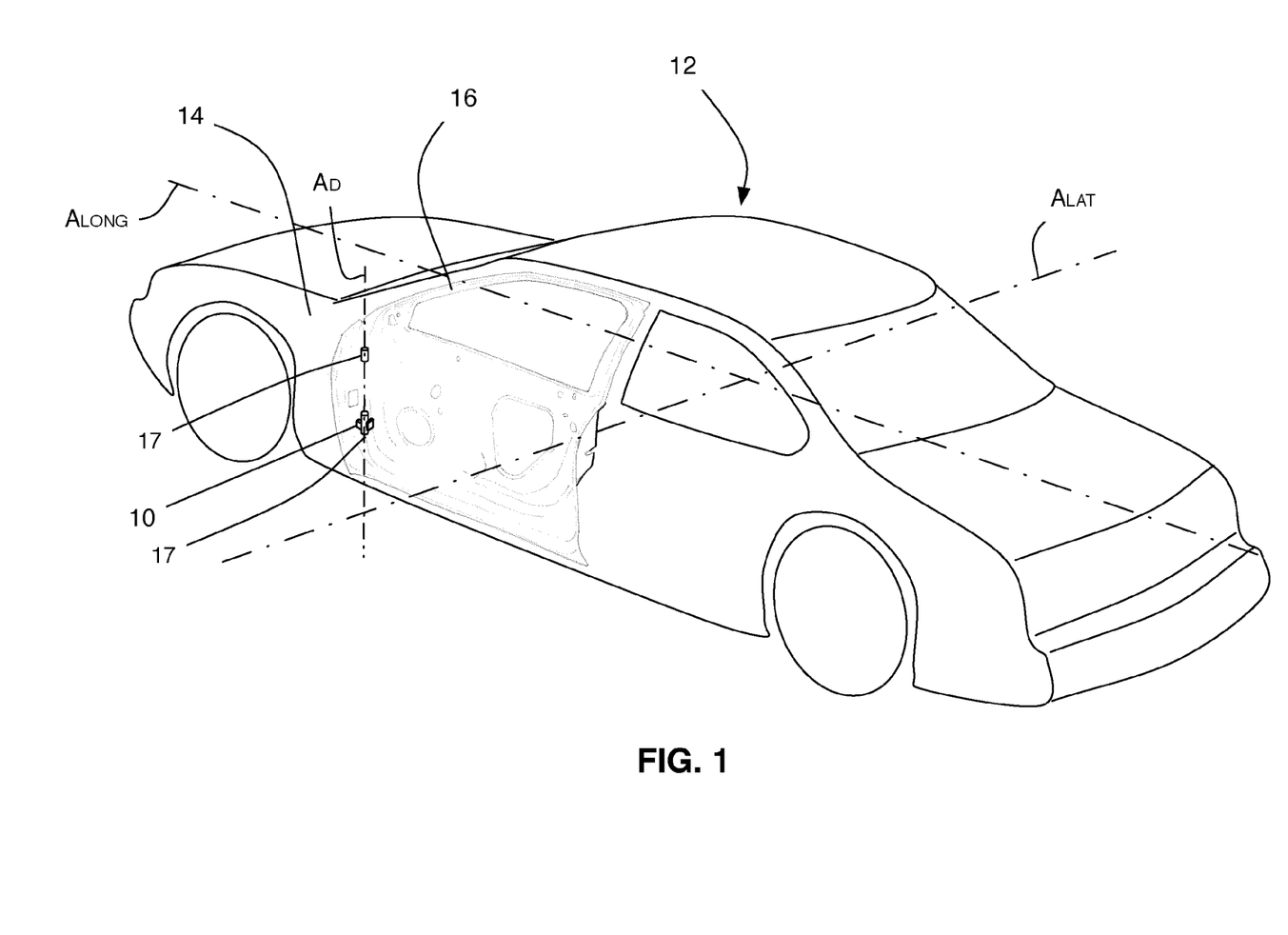
FIG. 1 is a perspective view of a vehicle that includes a vehicle door control system in accordance with an embodiment of the present disclosure.
Figure 2:
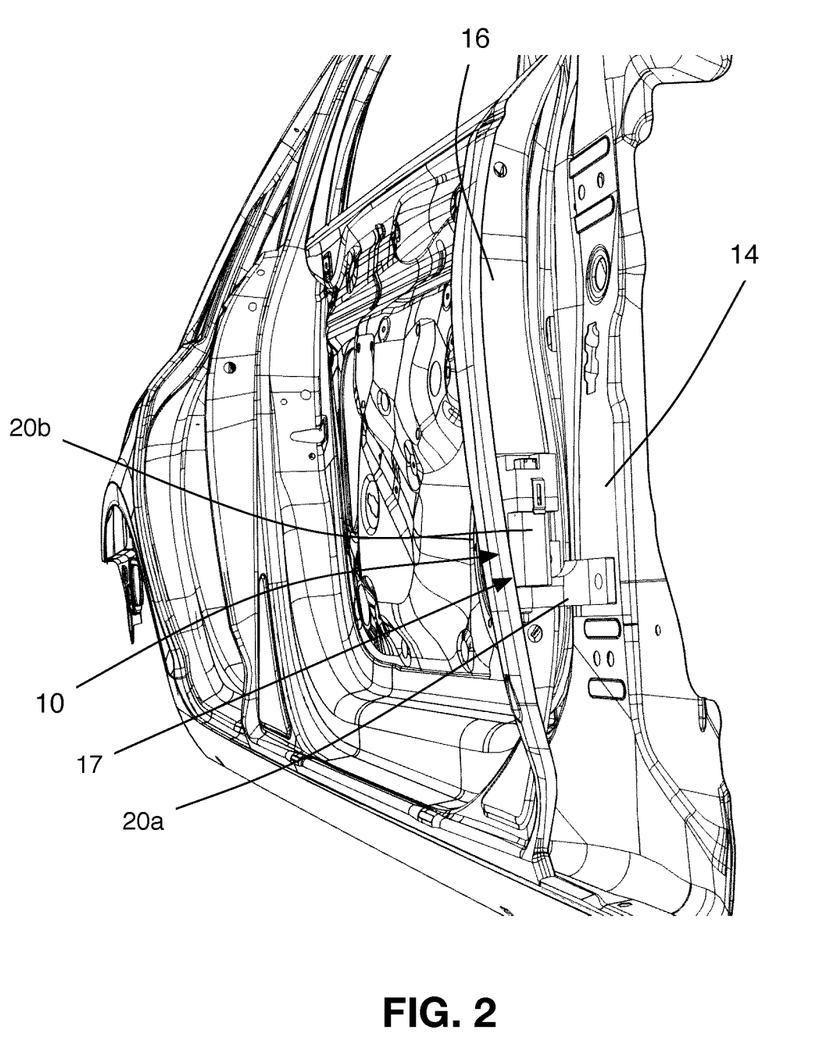
FIG. 2 is a magnified perspective view of the vehicle door control system shown in FIG. 1.
Figure 3:
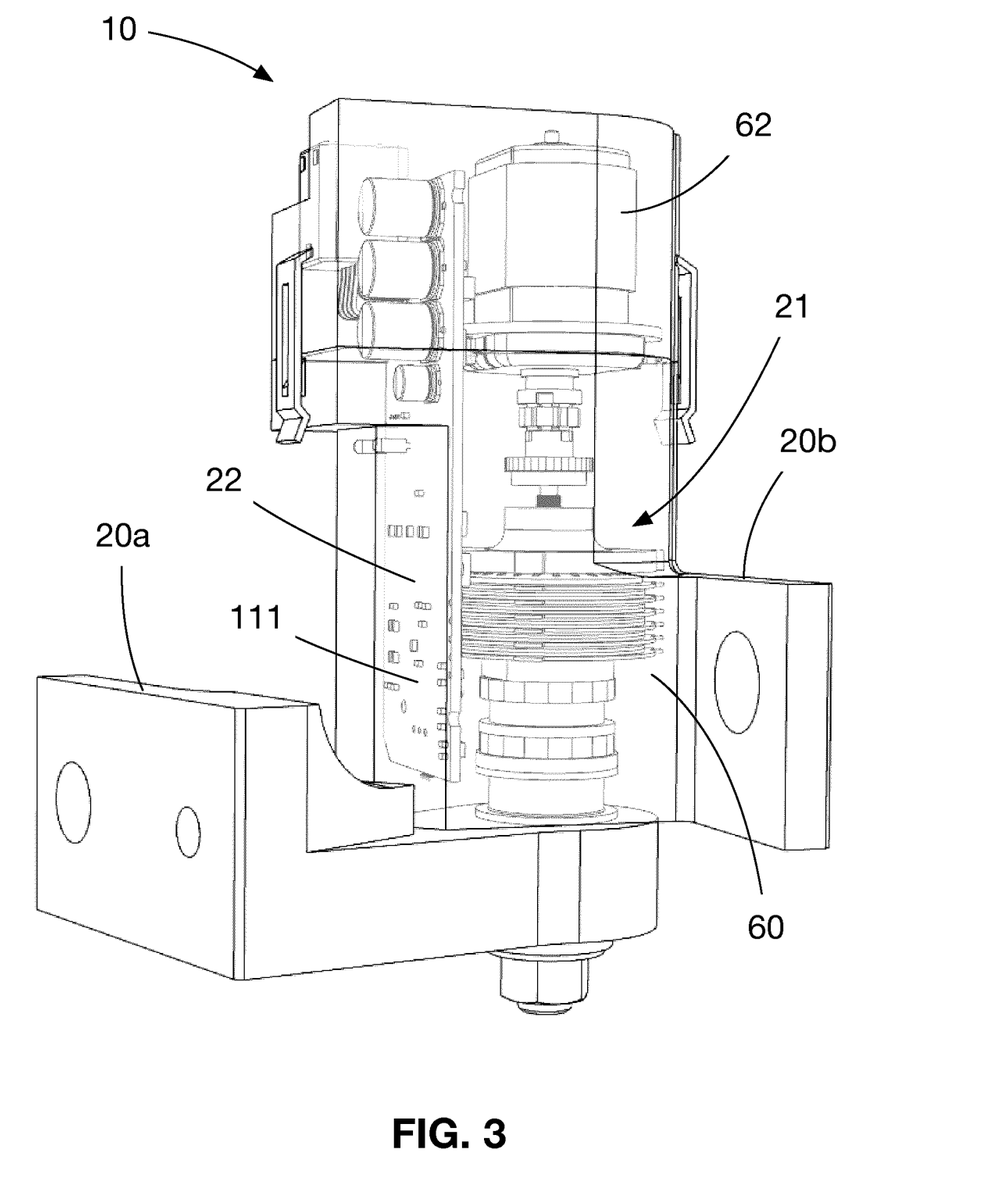
FIG. 3 is a further magnified, transparent, perspective view of the vehicle door control system shown in FIG. 1.
Figure 4:
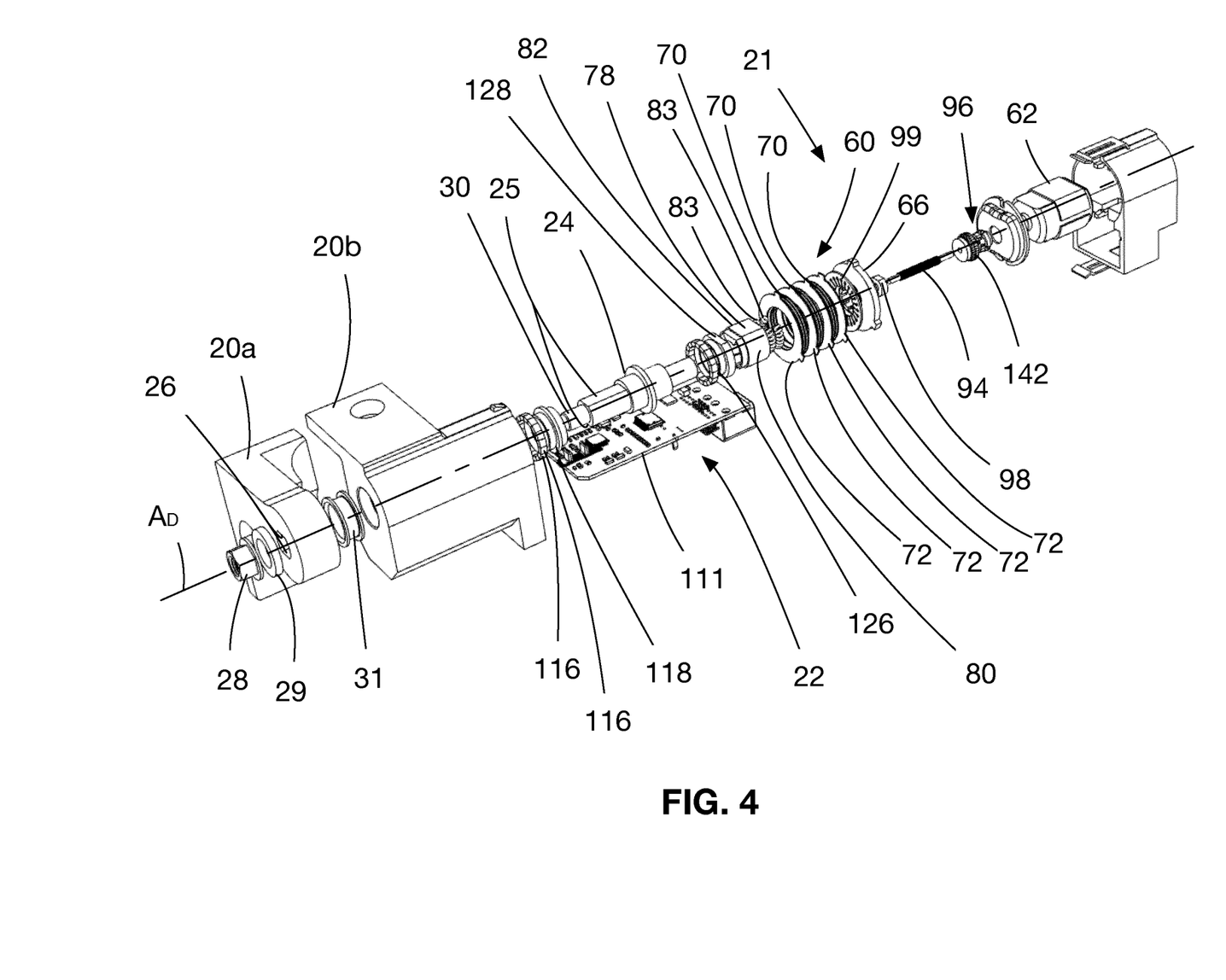
FIG. 4 is an exploded perspective view of the vehicle door control system shown in FIG. 1.

Reference is made to FIG. 1, which shows a vehicle door control system 10 for a vehicle 12 having a vehicle body 14 and a vehicle door 16 pivotally mounted to the body 14 by way of hinges 17 for pivoting movement about a door pivot axis $A_D$, in accordance with an embodiment of the present disclosure. The vehicle 12 has a longitudinal axis ALONG and a lateral axis $A_{LAT}$.

In the embodiment shown in FIG. 1, the vehicle door control system 10 incorporates one of the hinges 17.

The vehicle door control system 10 may, for simplicity, be referred to simply as the door control system 10.

In some embodiments, the vehicle door control system 10 can check the door 16 in a user-selectable position somewhere in a range of door movement between a fully open position and a fully closed position. In some embodiments, the door control system 10 can check the door 16 anywhere within the aforementioned range of movement, providing infinite door check capability in the aforementioned range of door movement. In some embodiments, the door control system 10 can check the door 16 in a user-selected position selected from amongst one or more discrete positions within the aforementioned range of movement. In some embodiments, the range of movement in which the vehicle door control system 10 can check the door 16 may be a subset of a range extending all the way between the fully open and fully closed positions. In some embodiments, the range of movement in which the vehicle door control system 10 can check the door 16 may be the entirety of a range extending all the way between the fully open and fully closed positions.

Figure 5:
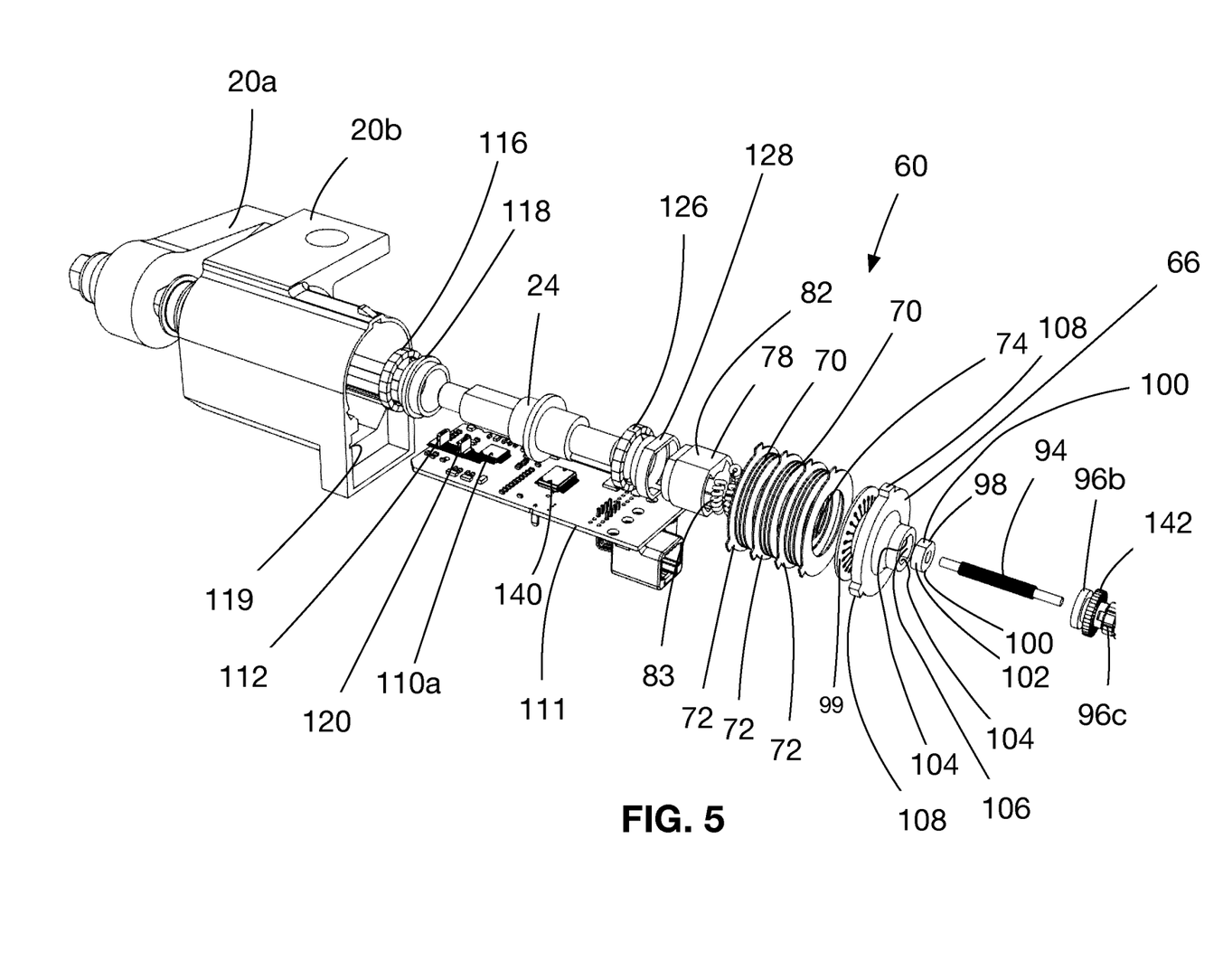
FIG. 5 is another exploded perspective view of the vehicle door control system shown in FIG. 1.

Referring to FIGS. 2-5, the door control system 10 includes a body hinge member 20a, a door hinge member 20b, a brake 21 (FIG. 3) and a control system 22. The body hinge member 20a is fixedly to the vehicle body 14 (FIG. 2) by any suitable means, such as by a plurality of machine screws, or by a weld. The door hinge member 20b is fixedly to the vehicle door 16 by any suitable means, such as by another plurality of machine screws, or by a weld. The door hinge member 20b is pivotally connected to the body hinge member 20a, for pivoting movement about the door pivot axis $A_D$. In the embodiment shown, a hinge pin 24 (FIG. 4) is rotationally joined to the body hinge member 20a and extends into a hinge pin aperture 26 in the door hinge member 20b. The rotational fixing of the hinge pin 24 to the body hinge member 20a may be by virtue of a pair of flats 25 on the hinge pin 24 that mate with a pair of flats 26 in a receiving aperture 27 in the body hinge member 20a. The hinge pin 24 is held in the receiving aperture 27 by a hinge pin locking nut 28 and an associated washer 29 that mount to a threaded end 30 of the hinge pin 24. A hinge pin bushing 31 rotatably supports the door hinge member 20b on the hinge pin 24, as best seen in FIG. 5. It is alternatively possible for the first and door hinge members 20a and 20b to be pivotally connected to one another in any other suitable way.

Figure 6:
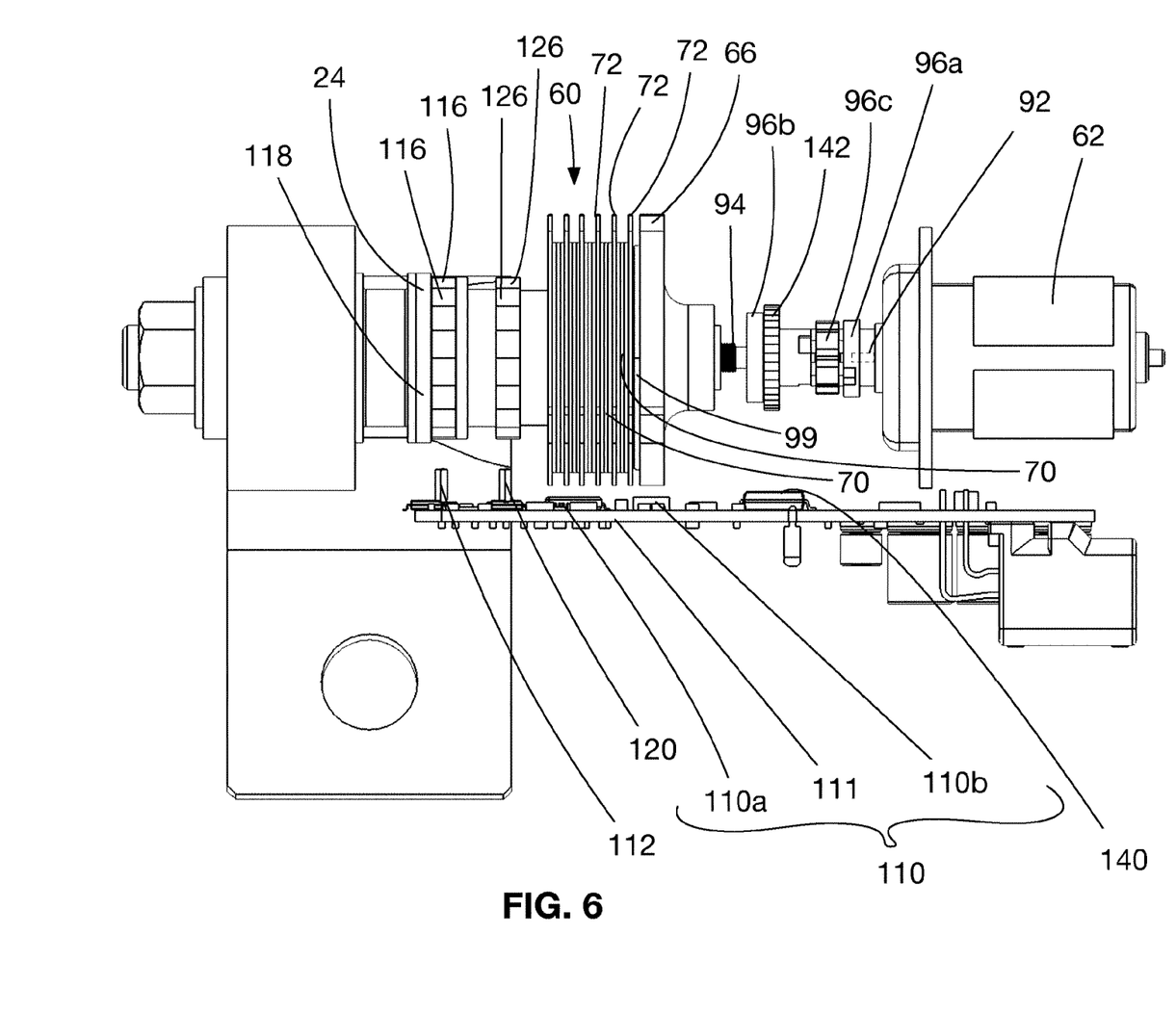
FIG. 6 is a side view of the vehicle door control system shown in FIG. 1, with a housing removed for greater clarity, with a brake in a braking position.
Figure 7:
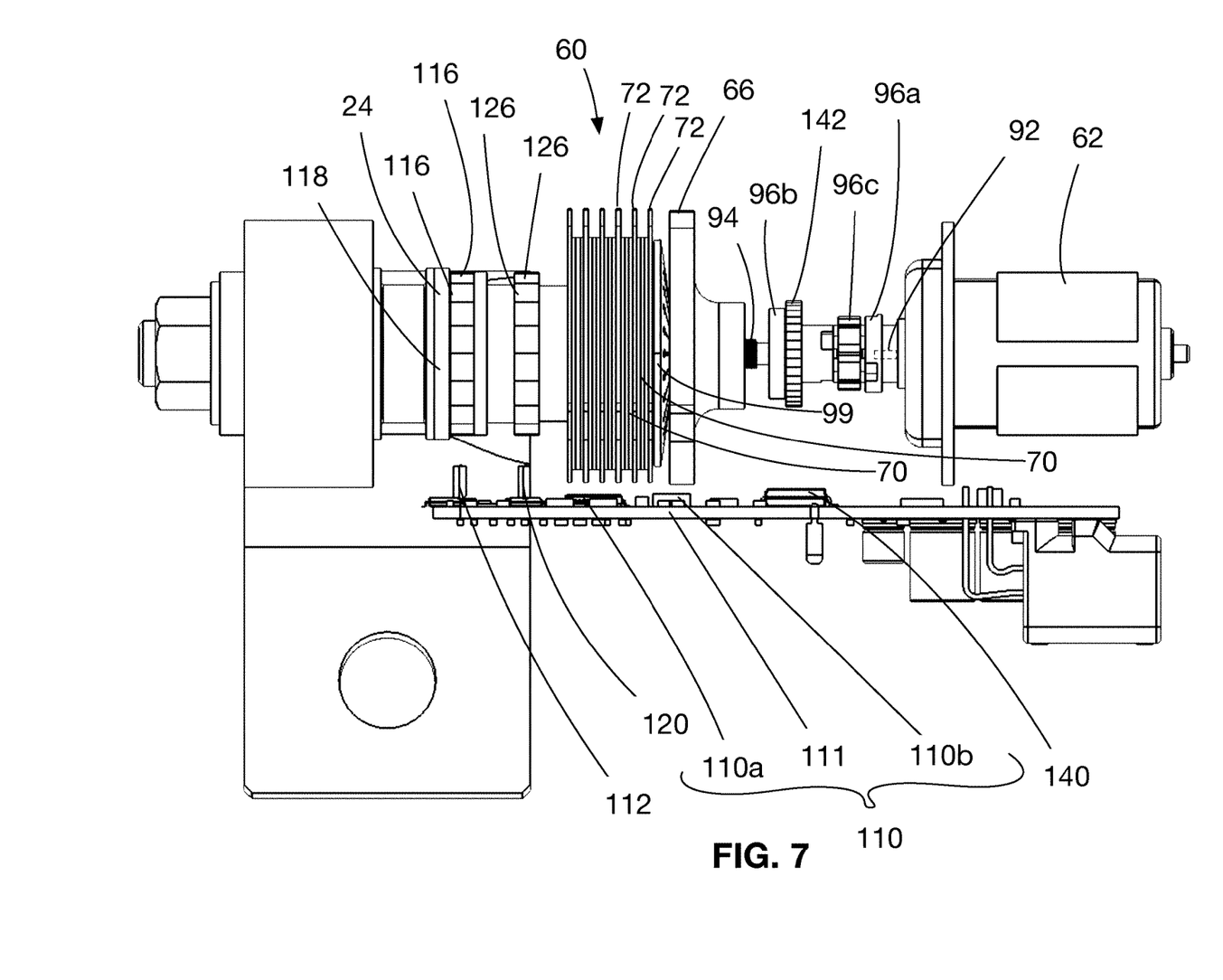
FIG. 7 is a side view of the vehicle door control system shown in FIG. 1, with the housing removed for greater clarity, with the brake in a release position.

The brake 21 is positionable in a braking position in which the brake 21 prevents rotation of the door hinge member 20b relative to the body hinge member 20a (FIG. 6) and a release position in which the brake 21 permits rotation of the door hinge member 20b relative to the body hinge member 20a (FIG. 7). In other words, the brake 21 is operable to releasably rotationally fix the door hinge member 20b to the body hinge member 20a. The brake 21 may include any suitable structure for releasably rotationally fixing the door hinge member 20b to the body hinge member 20a. In the embodiment shown, the brake 21 includes a plate pack 60, a motor 62 and a plate pack driver 66 that is movable by the motor 62 to selectively compress the plate pack 60.

Figure 8:
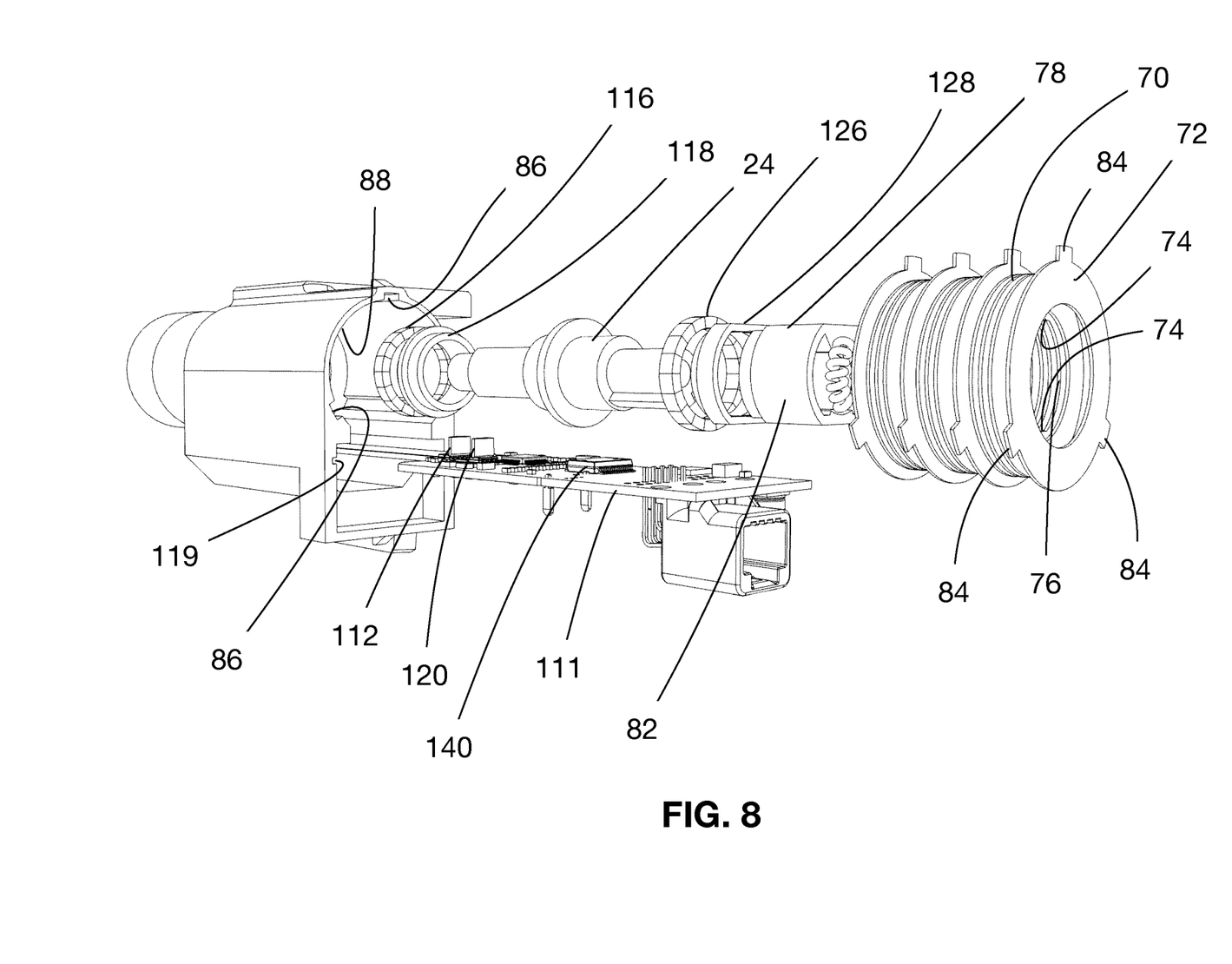
FIG. 8 is a magnified exploded perspective view of the vehicle door control system shown in FIG. 1.

Referring to FIG. 8, the plate pack 60 includes a plurality of body brake plates 70 interleaved with a plurality of door brake plates 72. The body brake plates 70 may be formed from three layers including a metallic support layer and friction pads on either side of the support layer. The body brake plates 70 are axially slidable relative to the body hinge member 20a but are rotationally joined to the body hinge member 20a. This may be achieved by a plurality of brake plate flats 74 on a radially inner surface 76 of each of the body brake plates 70 that engage a plurality of brake hub flats 78 on an exterior surface 80 of a brake hub 82. The brake hub 82 is itself rotationally joined to the body hinge member 20a. In the embodiment shown, the brake hub 82 is rotationally joined to the body hinge member 20a via at least one force transfer spring 83 (FIG. 9) that permits a small amount of rotational compliance, and which is explained in more detail further below.

Referring to FIG. 8 again, the door brake plates 72 are axially slidable relative to the door hinge member 20b but are rotationally joined to the door hinge member 20b. In the embodiment shown, this is achieved by a plurality of radial projections 84 on each of the door brake plates 72 that are received in a plurality of axially extending slots 86 in a radially inner surface 88 of the door hinge member 20b.

The plate pack 60 is positionable in a braking state (FIG. 6) in which the body brake plates 70 and the door brake plates 72 are frictionally engaged with one another to provide a first resistance to relative rotation therebetween so as to hold the vehicle door 16 in a selected position, and a release state (FIG. 7) in which the body brake plates 70 and the door brake plates 72 provide a second resistance to relative rotation therebetween that is less than the first resistance.

When the plate pack 60 is compressed to its braking state by the plate pack driver 66, the body brake plates 70 are frictionally engaged with a selected frictional brake force with the door brake plates 72 thereby rotationally fixing the body brake plates 70 and the door brake plates 72 together, which in turn rotationally fixes the door hinge member 20b to the body hinge member 20a, thereby holding the vehicle door 16 in a selected position with a resistive frictional torque (also referred to as a brake torque). To overcome this brake torque, (i.e. to cause the door to move a significant amount while the plate pack 60 is in its braking state), a first user torque would have to be applied by a vehicle user that is greater than the resistive frictional torque. The brake torque may be selected to be large but to not be so large as to make it impossible for the door 16 to be moved by a user if necessary (e.g. in an emergency where the plate pack 60 cannot be moved out of its braking state). This brake torque may be determined by experimentation with pre-production examples of the door control system 10.

When the plate pack 60 is decompressed (FIG. 7) to its release state by the plate pack driver 66, the door brake plates 72 and body brake plates 72 will slide axially a bit relative to one another so as to have relatively little (if any) contact with one another, thereby permitting the door brake plates 72 to rotate relative to the body brake plates 70, which in turn permits the door hinge member 20b to pivot more freely relative to the body hinge member 20a (as compared to its ability to pivot relative to the body hinge member 20a when the plate pack 60 is in its braking state). This, in turn, permits the vehicle door 16 to be opened or closed with less than a second user-applied torque that is lower than the first user-applied torque described above.

Worded another way, it may be said that the plate pack 60 is movable between a braking state in which the body brake plates 70 and the door brake plates 72 are frictionally engaged so as to provide a first selected resistance to relative rotation therebetween, so as to hold the vehicle door 16 in a selected position, and a release state in which the body brake plates 70 and the door brake plates 72 provide a second resistance to relative rotation therebetween that is less than the first resistance, (and which may be substantially zero resistance), thereby permitting the vehicle door 16 to be moved by a vehicle occupant. It may further be stated that the plate pack driver 66 is movable between a braking position (FIG. 6) in which the plate pack driver 66 compresses the plate pack 60 to bring the plate pack 60 to the braking state and a release position (FIG. 7) in which the plate pack driver 66 decompresses the plate pack 60 to bring the plate pack 60 to the release state.

The resistance to relative rotation between the body brake plates 70 and the door brake plates 72 may be referred to as the brake torque.

The motor 62 is operatively connected to the plate pack driver 66 to drive the plate pack driver 66 to the braking and release positions. The motor 62 may be operatively connected to the plate pack driver 66 by an operative connection shown at 90 (FIG. 6), which may include any suitable structure. In the embodiment shown, the motor 62 has a motor output shaft 92 (FIG. 4) which is connected to a brake leadscrew 94 via an alignment coupling 96, so as to permit some axial misalignment between motor output shaft 92 and the brake leadscrew 94. The alignment coupling 96 includes a first alignment coupling member 96a connected to the output shaft 92 and a second alignment coupling member 96b connected to the leadscrew 94. Axial projections extending from each alignment coupling member 96a and 96b extend through a compliance member 96c and into respective pockets in the other of each alignment coupling member 96a and 96b, in roughly similar manner to a Lovejoy coupling.

Referring to FIG. 5, the motor leadscrew 94 has a brake leadscrew nut 98 thereon, which is rotationally joined to the plate pack driver 66 in any suitable way (e.g. by way of flats 100 on an exterior surface 102 of the brake leadscrew nut 98, which engage flats 104 on a radially inner surface 106 of the plate pack driver 66). The plate pack driver 66 may include radial projections 108 that are similar to the radial projections 84 on the door brake plates 20b, and which are slidable within the slots 86 in the door hinge member 20b, so as to slidably connect the plate pack driver 66 to the door hinge member 20b and to rotationally fix the plate pack driver 66 to the door hinge member 20b. As a result, the brake leadscrew nut 98 is prevented from rotating relative to the door hinge member 20b when the brake leadscrew 94 is rotated by the motor 62. As a result, brake leadscrew nut 98 is translated axially by rotation of the brake leadscrew 94.

Optionally, a plate pack biasing member 99 may be provided on the plate pack driver 66. By providing the plate pack biasing member 99, one can position the plate pack driver 66 over a large range of positions in which there is a range of force being applied urging the body brake plates 70 and the door brake plates 72 together. This permits finer control over the brake torque that is applied between the brake plates 70 and 72, permitting the brake plate driver 66 to be positioned in intermediate positions that are between the braking position and the release position, in which an intermediate resistance is provided to relative rotation between the brake plates 70 and 72 (i.e. a resistance that is less than the first resistance to relative rotation therebetween, but greater than the second resistance to relative rotation therebetween.

Rotation of the motor 62 to drive the nut 98 and therefore the plate pack driver 66 in a first axial direction, which is a direction of increasing compression of the plate pack 60, increases the friction force (i.e. the brake force), and therefore the brake torque, between the body brake plates 70 and the door brake plates 72. Rotation of the motor 62 to drive the nut 82 and therefore the plate pack driver 66 in a second axial direction, which is a direction of decreasing compression of the plate pack 60, decreases the friction force, and therefore the brake torque, between the body brake plates 70 and the door brake plates 72.

By selecting the amount of compression that is applied to the plate pack 60, the brake force generated can be modulated. By controlling the rotation of the motor 62 in a selected way, the brake force can be applied at a selected ramp rate, for example, if it is desired to slow down the door in a progressive manner, rather than stopping it abruptly.

The control system 22 controls operation of the motor 62, and more particularly is configured to selectably drive the motor 62 to bring the plate pack driver 66 to the braking and release positions. The control system 22 includes a controller 110 that includes a processor 110a and a memory 110b and code which is stored in the memory 110b, which are mounted on a printed circuit board 111. The printed circuit board 111 may mount to the door hinge member 20b in any suitable way. For example, the printed circuit board 111 may mount into slots 119 in the door hinge member 20b and may be secured via adhesive or by any other suitable means.

The controller 110 may receive signals from other controllers within the vehicle 12 and may therefore operate in cooperation with other controllers within the vehicle to control the operation of the brake 21, or alternatively, the controller 110 may operate substantially independently of any other controllers in the vehicle.

The controller 110 may receive signals from one or more sensors to determine actions to take. For example, the control system may include a door position sensor 112. The door position sensor 112 is positioned to output signals based on a current position of the vehicle door 16. The control system 22 is configured in some situations to control operation of the motor 62 to position the plate pack driver 66 in one of the braking and release positions based on the current position of the vehicle door 16, as described further below.

The door position sensor 112 may be arranged as follows. One of the body hinge member 20a and the door hinge member 20b has a series of door position indicator magnets 116 thereon, which extends circular-arcuately about the door pivot axis $A_D$. The term 'circular-arcuately' means that the series of magnets 116 extends in a circular arc about an axis. Optionally, the circular arc may extend 360 degrees to form a complete ring about the axis. Alternatively the circular arc may extend less than 360 degrees. The door position sensor 112 may be a door-position-indicator-magnet Hall effect sensor supported on the other of the body hinge member 20a and the door hinge member 20b. One of the door-position-indicator-magnet Hall effect sensor 112 and the series of door position indicator magnets 116 pass sequentially past the other of the door-position-indicator-magnet Hall effect sensor 112 and the series of door position indicator magnets 116 during pivotal movement of the door hinge member 20b relative to the body hinge member 20a.

In the example shown, the body hinge member 20b has the series of door position indicator magnets 116 thereon, which extends circular-arcuately about the door pivot axis $A_D$. The series of magnets 116 are provided on a support member 118 which is fixedly mounted on the hinge pin 24. The Hall effect sensor 112 is mounted to the circuit board 111. Thus, the magnets 116 remain stationary and the Hall effect sensor 112 moves with the door hinge member 20b about the door pivot axis $A_D$ and is positioned to detect the presence of each magnet 116 in the series of door position indicator magnets 116. The controller 110 may count the number of magnets 116 (FIG. 6) that the Hall effect sensor 112 moves past during movement of the vehicle door 16 away from a first door position to a second door position, in order to determine a current position of the door 16 relative to a previous position for the door 16. It will be noted that, by using a Hall effect sensor that incorporates two Hall elements that are spaced apart in a circumferential direction, the controller 110 is able to determine the direction of rotation of the Hall effect sensor 112 relative to the magnets 116. This type of Hall effect sensor is referred to sometimes as a dual Hall effect sensor.

By counting the number of magnets 116 that are passed by the sensor 112 divided by the amount of time that elapsed during movement of the door 16, the door position sensor 112 is also usable by the control system 22 to determine the speed at which the vehicle door 16 is moving. The determined speed of the door 16 is usable by the control system 22 in at least several ways. For example, the control system 22 may be configured to cause the motor 62 to drive the plate pack driver 66 to the braking position when the control system 22 determines the speed of the vehicle door 16 is less than a selected value, which indicates that the user wishes to stop the door 16 in a certain position.

Additionally, the control system 22 can use the determined speed to determine how much braking force to apply via the plate pack 60 so as to prevent the door 16 from exceeding a predetermined maximum safe speed when near the end of travel for the door 16 so as to prevent the door 16 from being slammed into the vehicle body 14 during closing of the door 16 or from slamming into its end of travel stops during opening of the door 16.

When the brake 21 is in the braking position (and therefore, when the plate pack 60 is in the braking state) the controller 110 may use any suitable means for determining when it is appropriate to release the check force on the plate pack 60, so as to permit a user to move the door 16. For example, the controller 110 may be configured to determine how much torque a user is applying (referred to as a user torque) to the door 16 to move the door 16 away from a particular position. If the controller 110 determines that the user has applied at least a selected initiation torque the controller 110 may be programmed to release the check force on the plate pack 60 either partially or fully, by controlling the motor 62 to move the plate pack driver 66 to the release position.

To determine the amount of torque being applied to the door 16 by the user, the control system 22 may include a user torque sensor shown at 120. The user torque sensor 120 is positioned to output signals indicative of a torque applied by a vehicle user to move the vehicle door 16. The control system 22 is configured in some situations to control operation of the motor 62 to position the plate pack driver 66 in one of the braking and release positions based on signals from the user torque sensor 120, as described further below.

Figure 9:
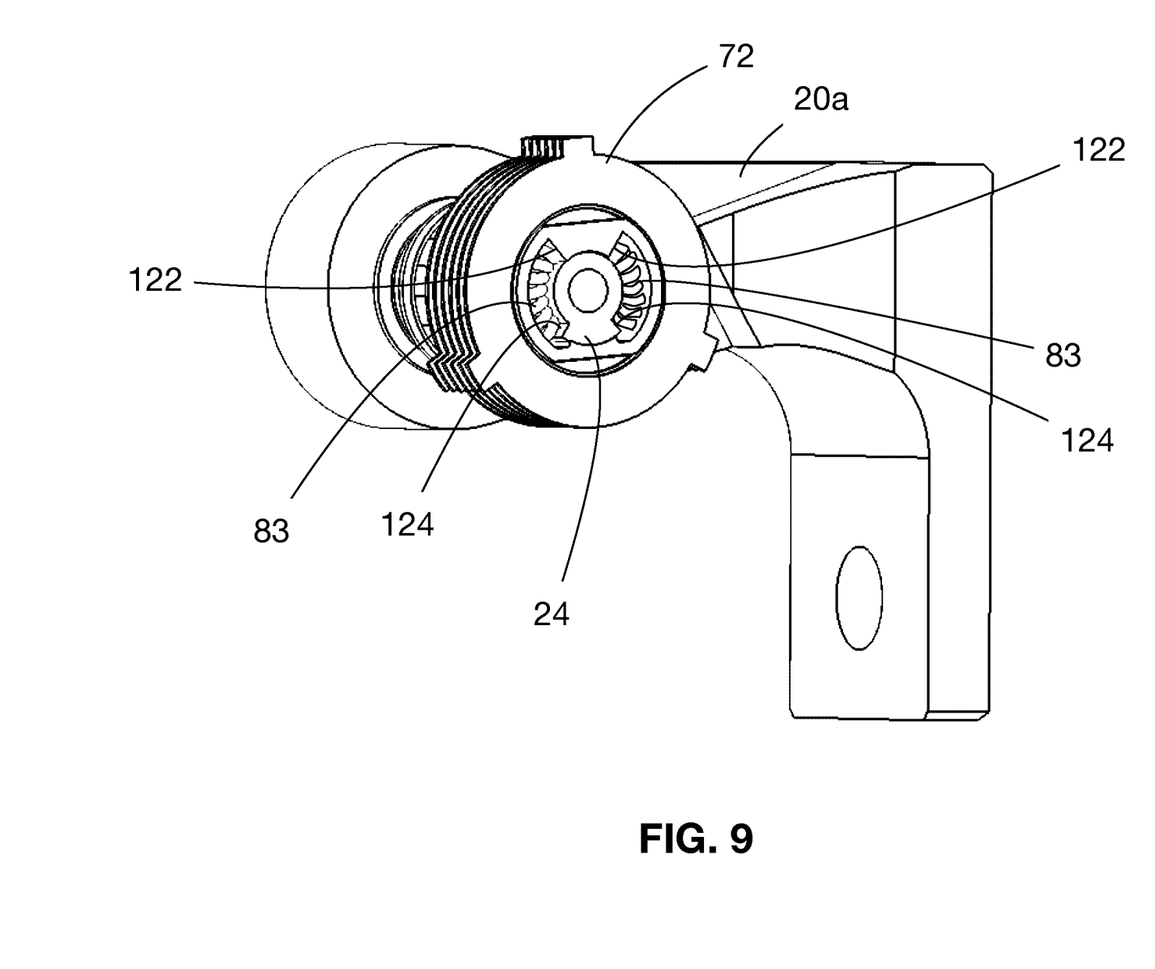
FIG. 9 is a sectional perspective view of the vehicle door control system shown in FIG. 1.

The user torque sensor 120 may be arranged as follows. As noted above, the vehicle door control system 10 optionally includes at least one force transfer spring 83 between the brake hub 82 and the hinge pin 24. As can be seen in FIG. 9, in the example shown, there are four force transfer springs 83, which are arcuate helical compression springs, extending arcuately between brake hub drive surfaces 122 and hinge pin drive surfaces 124.

Thus, the body brake plates 70 are rotationally joined to the body hinge member 20*a* via the at least one force transfer spring 83. When the plate pack 60 (FIG. 6) is in the braking state, the at least one force transfer spring 83 (FIG. 4) is therefore operatively between the door hinge member 20*b* and the body hinge member 20*a* so as to permit the door hinge member 20*b* to pivot by a selected amount relative to the body hinge member 20*b* based on the torque applied by the user (i.e. the user torque) to move the vehicle door 16. One of the body hinge member 20*a* and the door hinge member 20*b* has a series of user torque indicator magnets 126 thereon which extends circular-arcuately about the door pivot axis $A_D$. The user torque sensor 120 is a user-torque-indicator-magnet Hall effect sensor supported on the other of the body hinge member 20*a* and the door hinge member 20*b*. One of the user-torque-indicator-magnet Hall effect sensor 120 and the series of user torque indicator magnets 126 pass sequentially past the other of the user-torque-indicator-magnet Hall effect sensor 120 and the series of user torque indicator magnets 126 during pivotal movement of the door hinge member 20*b* relative to the body hinge member 20*a*.

In the example shown, the body hinge member 20*b* has the series of torque indicator magnets 126 thereon, which extends circular-arcuately about the door pivot axis $A_D$. The series of magnets 126 are provided on a support member 128 which is fixedly mounted on the brake hub 82. The Hall effect sensor 120 is mounted to the circuit board 111. Thus, the magnets 126 remain stationary and the Hall effect sensor 120 moves with the door hinge member 20*b* about the door pivot axis $A_D$ and is positioned to detect the presence of each magnet 126 in the series of door position indicator magnets 126. The controller 110 may count the number of magnets 126 (FIG. 6) that the Hall effect sensor 126 moves past when the user applies a user torque to the vehicle door 16 to try to move the vehicle door 16 away from a first door position. Based on the spring rate of the at least one force transfer spring 83, the amount of movement that is recorded by the controller 110 can be used to determine the amount of torque that is being applied by the user (i.e. the user torque). The controller 110 may be configured such that, if the user torque is determined to exceed a selected initiation torque, the controller 110 drives the motor 62 to drive the plate pack driver 66 to the release position, thereby releasing the vehicle door 16 for the user to move to a second position.

The control system 22 may include a brake force sensor 140 that is positioned to output signals indicative of a frictional brake torque between the body brake plates 70 and the door brake plates 72. The control system 22 may be configured to control operation of the motor 62 to position the plate pack driver 66 in one of the braking and release positions based on the signals from the brake force sensor 140. Optionally, the control system 22 may be configured to control operation of the motor 62 to position the plate pack driver 66 in at least one intermediate position between the braking position and the release position so as to apply a frictional brake torque that provides an intermediate resistance to relative rotation between the body brake plates 70 and the door brake plates 72 that is less than the first resistance to relative rotation and greater than the second resistance to relative rotation. To provide brake torque sensing, the brake may have a series of brake torque indicator magnets 142 that extends circular-arcuately about the door pivot axis $A_D$ and which is one of: supported on the door hinge member 20*b*, and positioned to rotate with the brake leadscrew 94. The brake force sensor 140 may be a brake-torque-indicator-magnet Hall effect sensor that is the other of: supported on the door hinge member 20*b*, and positioned to rotate with the brake leadscrew 94. One of the brake-torque-indicator-magnet Hall effect sensor 140 and the series of brake torque indicator magnets 142 pass sequentially past the other of the brake-torque-indicator-magnet Hall effect sensor 140 and the series of brake torque indicator magnets 142 during rotation of the brake leadscrew 94 by the motor 62.

In the example shown, the brake force sensor 140 is mounted on the circuit board 111 and is therefore supported on the door hinge member 20*b*, and the brake torque indicator magnets 142 are mounted on a support surface on the second alignment coupling member 96*b* and therefore are positioned to rotate with the brake leadscrew 94. By counting the number of magnets 142 that the Hall effect sensor 140 encounters, the controller 110 is capable of determining the position of the plate pack driver 66 and therefore can determine the amount of brake torque that is being applied by the plate pack 60.

While it has been shown for the brake 21 to be housed on the door hinge member 20*b*, it will be understood that it is alternatively possible to house the brake 21 on the body hinge member 20*a*. While it has been shown for the control system 22 to be housed on the door hinge member 20*b*, it will be understood that it is alternatively possible to house the control system 22 on the body hinge member 20*a*, or to house some of the control system 22 on the body hinge member 20*a* and some on the door hinge member 20*b*, or to house some of the control system 22 on one or both of the first and door hinge members 20*a* and 20*b*, or to house the control system entirely outside of the first and door hinge members 20*a* and 20*b*. Furthermore, the control system 22 has been shown to include a single controller 110 with a single processor 110*a* and a single memory 110*b*, it will be understood that the control system 22 may include at least one processor 110*a* (e.g. one processor, or more than one processor), and may include at least one memory 110*b* (e.g. one memory, or more than one memory).

Figure 10:
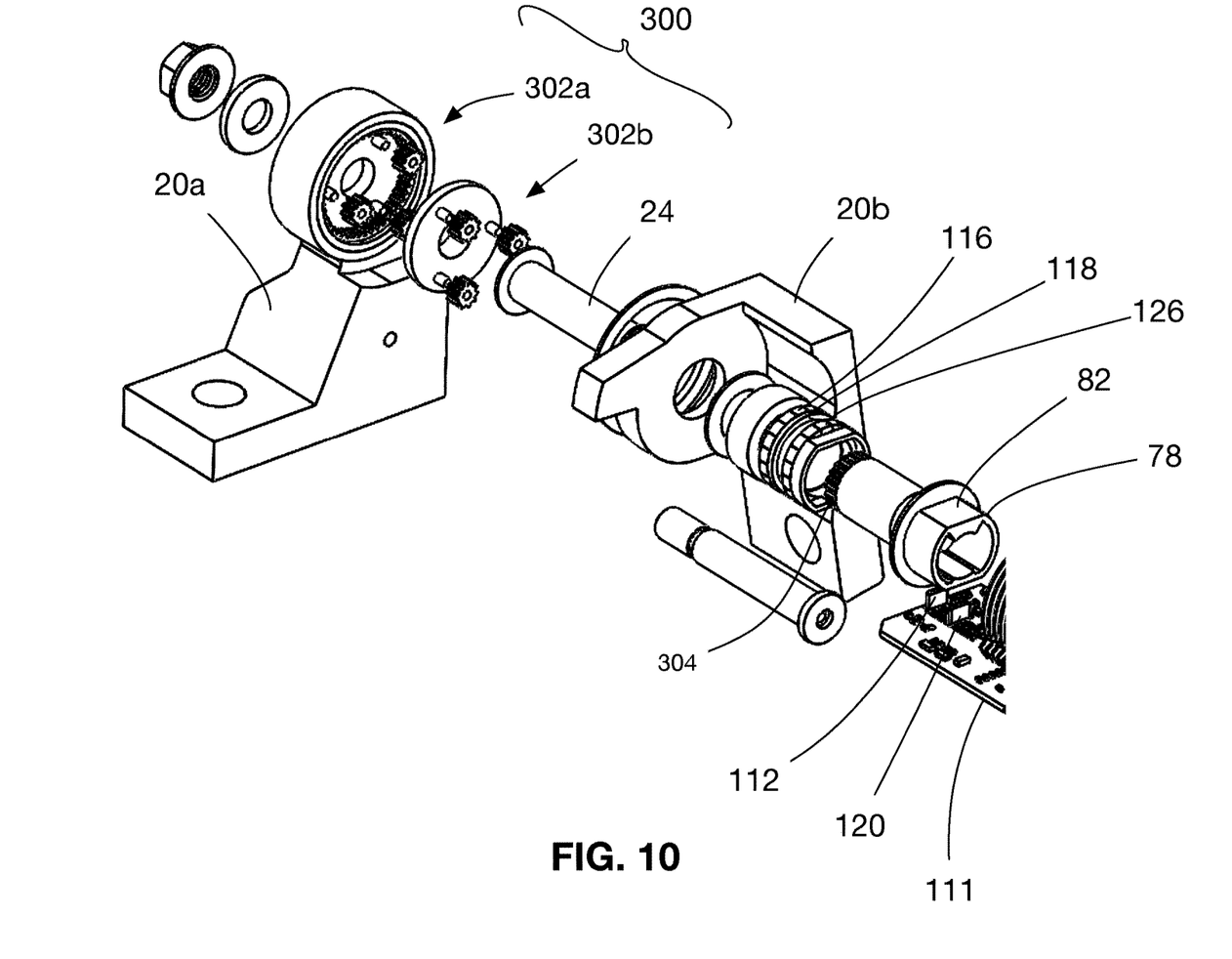
FIG. 10 is an exploded perspective view of an optional feature that can be included with the vehicle door control system shown in FIG. 1.
Figure 11:
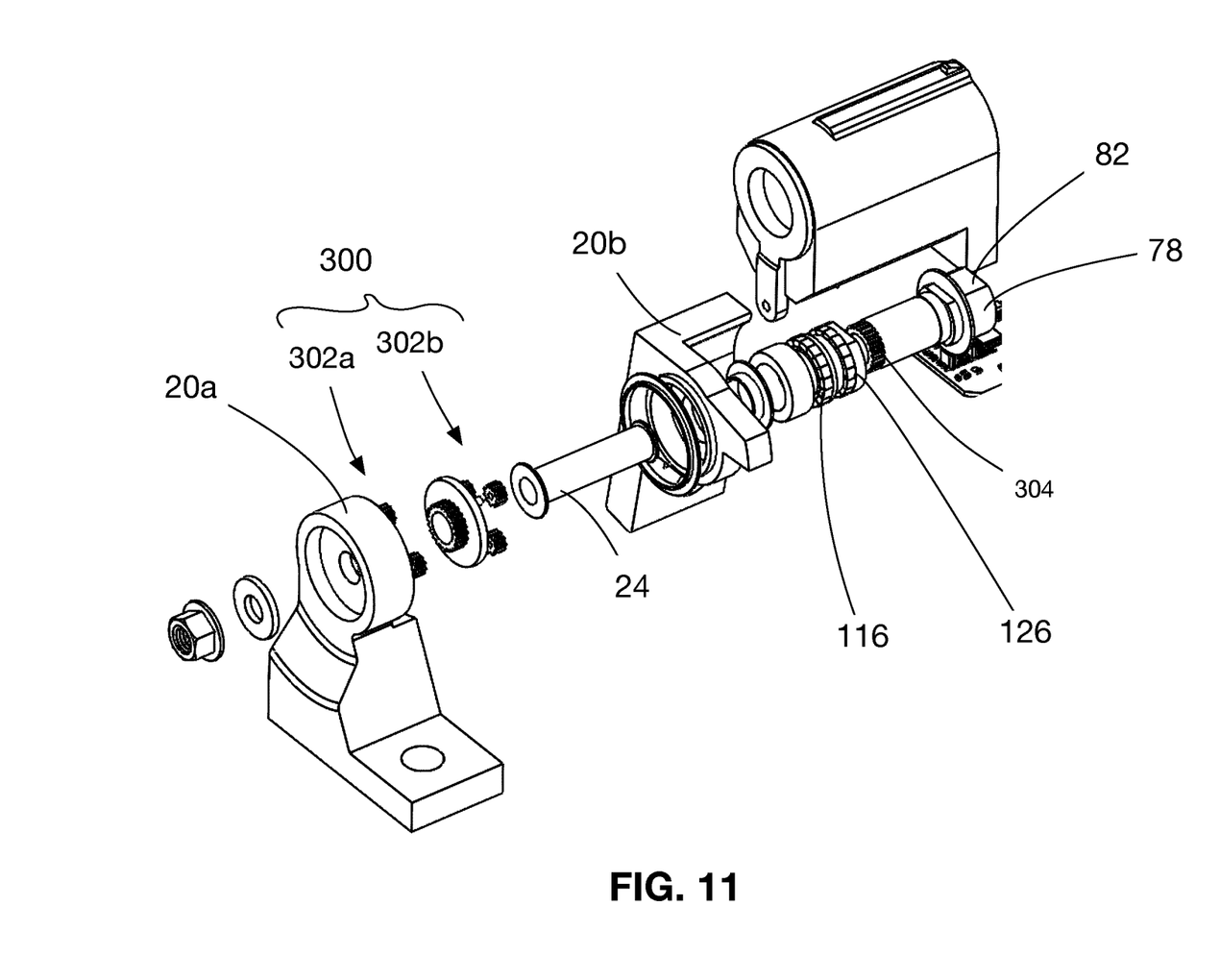
FIG. 11 is another exploded perspective view of the optional feature shown in FIG. 10.

Reference is made to FIGS. 10 and 11, which show an optional feature that can be provided with the vehicle door control system 10. The optional features is a transmission 300 that is arranged between the door hinge member and the door brake plates 72, such that the door brake plates 72 rotate faster than the door hinge member 20*b*. In the present embodiment, the transmission 300 is a double planetary transmission (including a first planetary transmission 302*a* that feeds into a second planetary transmission 302*b*), which provide a gear ratio of about 25:1. In other embodiments a gear ratio of greater than 25:1 may be provided, such as about 50:1. In other embodiments the transmission 300 may be a single planetary transmission, depending on the gear ratio desired. In still other embodiments, the transmission 300 may be some other type of transmission that provides a rotation ratio with gears or with some other means, such as a toothed belt. In the present embodiment, the transmission 300 is provided between the door hinge member 20*b* and the brake hub 82 (which can be seen with a final drive gear 304 thereon).

Several advantages arise from the presence of the transmission 300. Firstly, by increasing the speed of the door brake plates 72, the braking provide by the plate pack 60 can provide finer control of the amount of braking to the door 16 during operation of the vehicle door control system 10.

Secondly, during operation, the brake force applied by the plate pack 60 results in a torque increase in terms of the amount of brake torque that is applied to the door 16, thereby permitting the use of a smaller system.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A vehicle door control system for a vehicle having a vehicle body and a vehicle door, comprising:
   a body hinge member connected to the vehicle body;
   a door hinge member connected to the vehicle door, wherein the door hinge member is pivotally connected to the body hinge member for pivotal motion about a door pivot axis;
   a brake that includes
      a plate pack that includes a plurality of body brake plates connected to the body hinge member, and interleaved with a plurality of door brake plates connected to the door hinge member, wherein the plate pack is positionable in a braking state in which the body brake plates and the door brake plates are frictionally engaged with one another to provide a first resistance to relative rotation therebetween so as to hold the vehicle door in a selected position, and a release state in which the body brake plates and the door brake plates provide a second resistance to relative rotation therebetween that is less than the first resistance,
      a plate pack driver that is movable between a braking position in which the plate pack driver compresses the plate pack to bring the plate pack to the braking state and a release position in which the plate pack driver decompresses the plate pack to bring the plate pack to the release state, and
      a motor that is operatively connected to the plate pack driver to drive the plate pack driver to the braking and release positions, and
   a control system that is configured to selectably drive the motor to bring the plate pack driver to the braking and release positions,
   wherein the motor is connected to a brake leadscrew so as to drive rotation of the brake leadscrew, and wherein the brake leadscrew has a brake leadscrew nut thereon that is constrained against rotation, such that rotation of the brake leadscrew drives translation of the brake leadscrew nut, and wherein the brake leadscrew nut is connected to the plate pack driver.

2. A vehicle door control system as claimed in claim 1, wherein the brake leadscrew is non-backdrivable.

3. A vehicle door control system as claimed in claim 1, wherein the control system includes a door position sensor positioned to output signals based on a current position of the vehicle door, and wherein the control system is configured in some situations to control operation of the motor to position the plate pack driver in one of the braking and release positions based on signals from the door position sensor.

4. A vehicle door control system as claimed in claim 3, wherein one of the body hinge member and the door hinge member has a series of door position indicator magnets thereon which extends circular-arcuately about the door pivot axis,
   wherein the door position sensor is a door-position-indicator-magnet Hall effect sensor supported on the other of the body hinge member and the door hinge member, and
   wherein one of the door-position-indicator-magnet Hall effect sensor and the series of door position indicator magnets pass sequentially past the other of the door-position-indicator-magnet Hall effect sensor and the series of door position indicator magnets during pivotal movement of the door hinge member relative to the body hinge member.

5. A vehicle door control system as claimed in claim 4, wherein the control system is configured to determine a speed of the vehicle door based on signals for the door position sensor.

6. A vehicle door control system as claimed in claim 1, wherein the control system is further configured to cause the motor to drive the plate pack driver to the braking position when the control system determines the speed of the vehicle door is less than a selected value.

7. A vehicle door control system as claimed in claim 1, wherein a transmission connects the door hinge member to the door brake plates, such that the door brake plates rotate faster than the door hinge member.

8. A vehicle door control system as claimed in claim 7, wherein the transmission is a planetary transmission.

9. A vehicle door control system as claimed in claim 8, wherein the transmission provides a gear ratio of greater than 25:1.

10. A vehicle door control system as claimed in claim 7, wherein the transmission is a double planetary transmission.

11. A vehicle door control system for a vehicle having a vehicle body and a vehicle door, comprising:
a body hinge member connected to the vehicle body;
a door hinge member connected to the vehicle door, wherein the door hinge member is pivotally connected to the body hinge member for pivotal motion about a door pivot axis;
a brake that includes
a plate pack that includes a plurality of body brake plates connected to the body hinge member, and interleaved with a plurality of door brake plates connected to the door hinge member, wherein the plate pack is positionable in a braking state in which the body brake plates and the door brake plates are frictionally engaged with one another to provide a first resistance to relative rotation therebetween so as to hold the vehicle door in a selected position, and a release state in which the body brake plates and the door brake plates provide a second resistance to relative rotation therebetween that is less than the first resistance,
a plate pack driver that is movable between a braking position in which the plate pack driver compresses the plate pack to bring the plate pack to the braking state and a release position in which the plate pack driver decompresses the plate pack to bring the plate pack to the release state, and
a motor that is operatively connected to the plate pack driver to drive the plate pack driver to the braking and release positions, and
a control system that is configured to selectably drive the motor to bring the plate pack driver to the braking and release positions,
wherein the control system includes a user torque sensor positioned to output signals indicative of a torque applied by a vehicle user to move the vehicle door, and wherein the control system is configured to control operation of the motor to position the plate pack driver in one of the braking and release positions based on signals from the user torque sensor.

12. A vehicle door control system as claimed in claim 11, further comprising at least one force transfer spring operatively between the door hinge member and the body hinge member so as to permit the door hinge member to pivot by a selected amount relative to the body hinge member based on the torque applied by the user to move the vehicle door, when the plate pack is in the braking state,
wherein one of the body hinge member and the door hinge member has a series of user torque indicator magnets thereon which extends circular-arcuately about the door pivot axis, and
wherein the user torque sensor is a user-torque-indicator-magnet Hall effect sensor supported on the other of the body hinge member and the door hinge member, and
wherein one of the user-torque-indicator-magnet Hall effect sensor and the series of user torque indicator magnets pass sequentially past the other of the user-torque-indicator-magnet Hall effect sensor and the series of user torque indicator magnets during pivotal movement of the door hinge member relative to the body hinge member.

13. A vehicle door control system as claimed in claim 12, wherein the plurality of body brake plates are rotationally joined to the body hinge member via the at least one force transfer spring.

14. A vehicle door control system for a vehicle having a vehicle body and a vehicle door, comprising:
a body hinge member connected to the vehicle body;
a door hinge member connected to the vehicle door, wherein the door hinge member is pivotally connected to the body hinge member for pivotal motion about a door pivot axis;
a brake that includes
a plate pack that includes a plurality of body brake plates connected to the body hinge member, and interleaved with a plurality of door brake plates connected to the door hinge member, wherein the plate pack is positionable in a braking state in which the body brake plates and the door brake plates are frictionally engaged with one another to provide a first resistance to relative rotation therebetween so as to hold the vehicle door in a selected position, and a release state in which the body brake plates and the door brake plates provide a second resistance to relative rotation therebetween that is less than the first resistance,
a plate pack driver that is movable between a braking position in which the plate pack driver compresses the plate pack to bring the plate pack to the braking state and a release position in which the plate pack driver decompresses the plate pack to bring the plate pack to the release state, and
a motor that is operatively connected to the plate pack driver to drive the plate pack driver to the braking and release positions, and
a control system that is configured to selectably drive the motor to bring the plate pack driver to the braking and release positions,
wherein the control system includes a brake force sensor positioned to output signals indicative of a frictional brake torque between the body brake plates and the door brake plates, and wherein the control system is configured to control operation of the motor to position the plate pack driver in one of the braking and release positions based on the signals from the brake force sensor.

15. A vehicle door control system as claimed in claim 14, wherein the control system is configured to control operation of the motor to position the plate pack driver in at least one intermediate position between the braking position and the release position so as to apply a frictional brake torque that provides an intermediate resistance to relative rotation between the body brake plates and the door brake plates that is less than the first resistance to relative rotation and greater than the second resistance to relative rotation.

16. A vehicle door control system as claimed in claim 14, wherein the motor is connected to a brake leadscrew so as to drive rotation of the brake leadscrew, and wherein the brake leadscrew has a brake leadscrew nut thereon that is constrained against rotation, such that rotation of the brake leadscrew drives translation of the brake leadscrew nut, and wherein the brake leadscrew nut is connected to the plate pack driver,
wherein the brake has a series of brake torque indicator magnets that extends circular-arcuately about the door pivot axis and which is one of: supported on the door hinge member, and positioned to rotate with the brake leadscrew, and
wherein the brake force sensor is a brake-torque-indicator-magnet Hall effect sensor that is the other of: supported on the door hinge member, and positioned to rotate with the brake leadscrew, and wherein one of the brake-torque-indicator-magnet Hall effect sensor and the series of brake torque indicator magnets pass sequentially past the other of the brake-torque-indicator-magnet Hall effect sensor and the series of brake torque indicator magnets during rotation of the brake leadscrew by the motor.

\* \* \* \* \*